United States Patent [19]

Henderson et al.

[11] Patent Number: 5,257,241
[45] Date of Patent: * Oct. 26, 1993

[54] METHOD AND SYSTEM FOR ACQUISITION OF 3-DIMENSIONAL MARINE SEISMIC DATA

[75] Inventors: Gerald J. Henderson; Peter C. Johnson; Peter G. Rigsby; Lawrence B. Sullivan, all of Plano, Tex.

[73] Assignee: Atlantic Richfield Company, Los Angeles, Calif.

[ * ] Notice: The portion of the term of this patent subsequent to May 12, 2009 has been disclaimed.

[21] Appl. No.: 697,573

[22] Filed: May 8, 1991

[51] Int. Cl.$^5$ ................................................ G01J 1/38
[52] U.S. Cl. ........................................ 367/15; 181/110
[58] Field of Search ...................... 367/15, 16, 20, 57, 367/58, 129, 135; 181/110, 112

[56] References Cited

U.S. PATENT DOCUMENTS

| | | | |
|---|---|---|---|
| 2,590,531 | 3/1952 | McLoad | 177/352 |
| 3,212,600 | 10/1965 | Hensley | 181/5 |
| 3,551,890 | 12/1970 | Silverman | 340/171 |
| 3,581,273 | 5/1971 | Hedberg | 340/7 PC |
| 3,722,014 | 3/1973 | Hill et al. | 9/8 |
| 3,906,352 | 9/1975 | Parker | 340/7 R |
| 4,197,591 | 4/1980 | Hagemann | 367/6 |
| 4,242,740 | 12/1980 | Ruehle | 367/15 |
| 4,272,835 | 6/1981 | Flood et al. | 367/4 |
| 4,516,227 | 5/1985 | Wener et al. | 367/15 |
| 4,555,779 | 11/1985 | Roberts | 367/19 |
| 4,635,236 | 1/1987 | Roberts | 367/19 |
| 4,868,793 | 9/1989 | Dunbar | 367/16 |
| 4,870,624 | 9/1989 | Marschall | 367/15 |
| 4,933,912 | 6/1990 | Gallagher | 367/59 |
| 4,958,328 | 9/1990 | Stubblefield | 367/15 |
| 4,970,696 | 11/1990 | Crews et al. | 367/15 |
| 4,970,697 | 11/1990 | Earley et al. | 367/15 |
| 5,022,013 | 6/1991 | Dalton et al. | 367/4 |
| 5,113,377 | 5/1992 | Johnson | 367/20 |

OTHER PUBLICATIONS

McQuillin, et al., An Introduction to Seismic Interpretation (Gulf Publishing Co., 1984), pp. 107-109.

Tatham, et al., "$V_p N_s$—A Potential Hydrocarbon Indicator" Geophysics, vol. 41, No. 5 (Oct. 1976) pp. 837-849.

Crews, et al., "Applications of New Recording Systems to 3-D Survey Designs," Expanded Abstracts with Biographies, 1989 Technical Program, 59th Annual International SEG Meeting, Paper SA 1.6.

Krey, "Attenuation of Random Noise by 2-D and 3-D CDP Stacking and Kirchhoff Migration", Geophysical Prospecting 35 (1987), pp. 135-147.

Gehrmann, et al., "Marine Shear Wave Profiling" Expanded Abstracts with Biographies: 1984 Technical Program (Society of Exploration Geophysicists, 1984), pp. 592-594.

Primary Examiner—Ian J. Lobo
Attorney, Agent, or Firm—Vinson & Elkins

[57] ABSTRACT

A marine seismic surveying system and method are disclosed. A plurality of receiver arrays, each arranged as groups of receivers (hydrophones or geophones) mounted along a cable, extend from a central location thereamong, and are connected to a platform near the central location. Systems with single and multiple platforms and their associated arrays are disclosed. The arrays each extend from the central location in different directions, preferably in a symmetrical fashion, and have their terminal ends fixed in position by way of an anchor or dynamic positioning means. Position and depth indicating instruments are also preferably mounted in each array, and at other locations in the area so that the receivers may be accurately located. The survey is accomplished by a seismic source traveling along a path which intersects the lines defined by one or more of the seismic arrays at an angle, for example a 45° angle for perpendicularly deployed arrays. As a result, seismic data is acquired which is uniform in fold, and which has distributed offset distances and azimuths for each bin, so that full 3-D surveys and VSP can be readily performed with high accuracy and efficiency.

44 Claims, 6 Drawing Sheets

- SOURCE LOCATION
- RECEIVER LOCATION

- SOURCE LOCATION
○ RECEIVER LOCATION

METHOD AND SYSTEM FOR ACQUISITION OF 3-DIMENSIONAL MARINE SEISMIC DATA

This invention is in the field of sub-surface geological surveying, and is more specifically directed to the acquisition of seismic data from marine environments in performing the same.

This application is related to U.S. Pat. No. 5,113,377, filed contemporaneously herewith and assigned to Atlantic Richfield Company.

BACKGROUND OF THE INVENTION

The surveying of sub-surface geological formations by analyzing seismic energy, such as acoustic vibrations, has been done for many years. As is fundamental in such surveying, acoustic vibrations are generated at a source location in the area of interest and, after reflection (or, in some cases, refraction) mode conversion from sub-surface strata, are detected by receivers at numerous locations. The sensed vibration signals are typically recorded and subsequently analyzed by conventional computer equipment. The measured travel times of the seismic energy from the source to the receiver locations and the characteristics of the received energy each provide information concerning the sub-surface strata and interfaces therebetween, particularly the depth and location of potential hydrocarbon reservoirs. As is also well known in the art, such surveys are performed in both land and marine environments to determine the most suitable location for the drilling of a well for production of the hydrocarbon products.

Also as is well known, the receivers in such surveys not only detect the reflected seismic energy of interest, but also detect other vibrations which, for purposes of the survey, are considered as "noise". Such noise includes multiply-reflected vibrations, as well as other coherent, and also random, noise. A common surveying technique which provides enhancement of the "signal" portion of the detected energy relative to the noise is the use of multiple "fold" data. This technique activates the seismic source at a number of locations for receipt by multiple seismic detectors. The seismic energy detected over time is "gathered" by identifying those recorded traces corresponding to the same sub-surface reflection point (i.e., "common depth point" or "CDP") and summing these traces together in such a manner that the reflected signal of interest is enhanced relative to the noise. The number of traces gathered for a CDP, i.e., into a "bin", is commonly referred to as its "fold".

To generate a seismic survey in a desired sub-surface plane, receivers are arranged in a single line, and the location of the seismic source is collinear with or parallel to the line of receivers. This survey is commonly referred to as a "2-D" survey. Multiple fold data is obtained by moving the location of the source relative to the line of receivers so as to maintain a common depth point for multiple pairs of source/receiver locations. Conventional CDP gathering and other analysis of the recorded traces provides a survey of the sub-surface geology that is interpreted to be a single vertical plane beneath the shot line.

In order to survey the sub-surface strata over a surface area of the earth using this technique, however, multiple 2-D surveys must be taken from multiple parallel 2-D lines, with the resulting vertical plane surveys cumulatively analyzed to provide an estimated three-dimensional survey. Data acquisition by incrementally repeating 2-D survey lines is, of course, quite cumbersome. In addition, since the 2-D lines are parallel, rarely is seismic data received or analyzed which travels at known angles (i.e., azimuths) other than that of the parallel 2-D lines. Accordingly, even though data is detected over a two-dimensional surface of the earth, a true 3-D survey cannot be done since all data is received as if taken at a common azimuth.

Some prior techniques are directed to facilitating the acquisition of sufficient seismic data to generate a 3-D survey. A common one of such prior techniques is the so-called "swath" survey, where the receiver array consists of a number of relatively closely spaced parallel lines of receivers, for example spaced by a distance on the order of one-eighth of a mile apart, each line of receivers being several miles long. According to this method, the seismic source location moves in a direction along the length of the array (having positions within the array, outside of the array, or both), with the seismic signals detected by each receiver in the swath recorded and processed.

While the swath survey is commonly referred to as "3-D" due to the areal distribution of the receivers, true three-dimensional surveys are not generally obtained by this method. Firstly, the geometry of the swath necessarily provides a non-uniform azimuthal distribution of data, as most of the source-receiver paths are in nearly the same direction, i.e., from close to the same azimuth, and are strictly determined by offset. As such, for a given source location significantly more data is obtained from within a narrow azimuthal range (e.g., on the order of 5° or less) than at other angles, and the small amount of data that is acquired at different azimuths is necessarily limited to relatively short source/receiver offset distances. Secondly, the data processing techniques used with such swath surveys is conventionally limited to strictly 2-D analysis, by treating the data from varying azimuths as though it is at a common azimuth with the majority of the receivers in the swath array. Such analysis limits the resulting survey to providing multiple 2-D surveys in parallel vertical planes.

Another example of a so-called 3-D survey, using multiple parallel 2-D shot lines in a marine environment, is described in U.S Pat. No. 3,581,273. This reference shows a marine seismic survey method which uses a vessel having a towed streamer of receivers and towed sources which are not in line with the towed streamer. As described in column 6, lines 10 through 19, of this reference, three-dimensional records of the survey profiles are provided by multiple towed spreads of recording instruments, for example by towing three parallel lines of such spreads.

By way of further background, prior marine survey techniques for obtaining 3-D data are known which include parallel shot lines. One such method deploys bottom-fixed receivers, such as geophones, either in straight parallel lines or as a loop having two parallel sides of geophones and, usually, a "dead zone" around the curved portion.

Another 3-D marine survey using parallel shot lines is described in U.S. Pat. No. 3,906,352, where two vessels travel parallel to one another, each towing a streamer of hydrophones and a source. Each towed hydrophone array records shots from both the source towed by its own vessel, and from the source of the other vessel. As illustrated in FIG. 4 of this reference, the resulting survey includes the shot line of each vessel, and also shot lines between vessels.

By way of further background, U.S. Pat. No. 4,870,624 describes a method of obtaining a 3-D marine survey where cultural artifacts, such as existing drilling platforms, limit the navigability of the towing vessels. As described therein, stationary receivers are deployed in a line between two of the cultural objects, and a towed source is periodically activated as it travels in the survey area. The survey is accomplished by combining the results of the surveys of a number of sub-areas, according to a described method of transformation. Conventional 3-D migration is then applied to the transformed data.

Another prior method of acquiring some amount of 3-D marine survey data includes the towing of an areal arrangement of sources. U.S. Pat. No. 4,868,793, assigned to Atlantic Richfield Company, describes a method for towing an array of sources, and for controlling the timing of the firing thereof as used in a 3-D marine survey.

Full 3-D land- and marine surveys are described in U.S. Pat. No. 4,970,696, issued Nov. 13, 1990, assigned to Atlantic Richfield Company, and incorporated herein by this reference. In the land survey case described therein, seismic data of varying azimuths is acquired by arranging the receivers in multiple patterns, and moving the source location around the patch of multiple patterns. A similar survey is described in Crews, et al., "Applications of New Recording Systems to 3-D Survey Designs," *Expanded Abstracts with Biographies*, 1989 *Technical Program, 59th Annual International SEG Meeting*, Paper SA 1.6, (Society of Exploration Geophysicists, 1989), pp. 624–27, also incorporated herein by this reference. As described at column 3, line 66 through column 4, line 3 of said U.S. Pat. No. 4,970,696, this technique is applicable to marine surveys with the receiver patterns placed on the seafloor or suspended thereabove. According to another embodiment described therein, a marine seismic survey is obtained by the towing of an array of receivers (corresponding to a pattern in the land case) through the off-shore region of interest, where a separate source vessel travels around the towed array to provide source seismic energy at the appropriate locations.

In each of the full 3-D surveys described in said U.S. Pat. No. 4,970,696, seismic data is acquired at many azimuths (i.e., relative angles between source and receiver locations). This data provides for a true three-dimensional survey to be obtained, detecting sub-surface geological discontinuities which are at varying angles. In addition, other effects, such as near-surface effects, velocity changes, and the like may be characterized in the three-dimensional sense using this data. It should also be noted that the amount of data obtained (i.e., the fold) by such a true 3-D survey may be reduced, typically by a factor of from three to five, from that acquired according to prior 2-D surveys while maintaining the same degree of random noise attenuation. The theory explaining such fold reduction is described in Krey, "Attenuation of Random Noise by 2-D and 3-D-CDP Stacking and Kirchhoff Migration", *Geophysical Prospecting* 35 (1987), pp. 135–147, also incorporated herein by this reference.

The methods described in U.S. Pat. No. 4,970,696 provide accurate and thorough surveys which are fully three-dimensional, by acquiring data at varying azimuths. It has been observed, however, that such surveys also provide significant redundancy in the data acquired. In the towed array case particularly, inefficiency in the survey may result due to the time required for the vessel towing the receiver array to turn around and re-enter the survey area, such that the source and receiver arrays are in the proper relative position. The time during which vessels are traveling instead of generating and receiving seismic signals, can be significant for surveys of conventional size.

By way of further background, U.S. Pat. No. 4,933,912, issued Jun. 12, 1990, describes a three dimensional prospecting method which deploys an areal array of sources and receivers in the survey area. In the example shown relative to FIGS. 3 and 4, a 3-D land survey is shown where 45 stations of 23 lines are used for a 24 fold survey of an area 9,460 ft. by 4,840 ft. The reference further describes a method of data analysis where certain source-receiver pairs are selected for common midpoints, such that data of varying offsets and azimuths is acquired. The large number of receiver locations should be noted, particularly in considering the potential application of this prior technique to marine surveys.

It is therefore an object of this invention to provide a marine survey technique which acquires full 3-D seismic information at reduced surveying cost.

It is a further object of this invention to provide improved 3-D surveys due to improvements in noise reduction achieved by providing uniform spatial sampling.

It is a further object of this invention to provide improved 3-D and vertical seismic profile (VSP) surveys in which static corrections may be performed in three dimensions.

It is a further object of this invention to provide such a survey which reduces the number of receivers necessary, and hence reduces the redundant data acquired.

It is a further object of this invention to provide such a survey which efficiently utilizes the source vessel by increasing the fraction of time during which it can be providing seismic energy relative to the time required for travel between source line or segment locations.

It is a further object of this invention to provide such a survey which accurately acquires 3-D seismic information in areas with drilling rigs and other cultural obstructions.

It is a further object of this invention to provide such a survey which may be deployed in modular fashion, such that excess receivers need not be deployed beyond that required for the desired 3-D or VSP survey.

It is a further object of this invention to provide such a survey which allows for modular replacement of damaged receiver arrays, reducing the risk of liability and loss.

It is a further object of this invention to provide such a survey in which the depth of the receivers may be optimized.

Other objects and advantages of the invention will be apparent to those of ordinary skill in the art having reference to the following specification together with its drawings.

SUMMARY OF THE INVENTION

The invention may be incorporated into a system of marine seismic receivers, and a method of operating the same, in which the receivers are deployed in a plurality of arrays extending out from a central location, and connected to a signal collection platform. The arrays include multiple groups of receivers (either hydrophones or geophones) as well as apparatus for indicating the position and depth of the arrays at various locations thereupon. The output of the receiver groups is communicated to the signal collection platform for recording, or for transmission therefrom to a receiving station. Either a single platform, or multiple platforms, may be deployed in the area of the desired survey to obtain a true 3-D seismic survey with uniform spatial sampling, and including seismic data at varying offsets and azimuths. Selection of the path traveled by the seismic source relative to the receiver arrays can readily provide data with the desired offset and azimuthal distributions, maintaining the uniform spatial sampling.

DETAILED DESCRIPTION OF THE PREFERRED EMBODIMENTS

Figure 1:
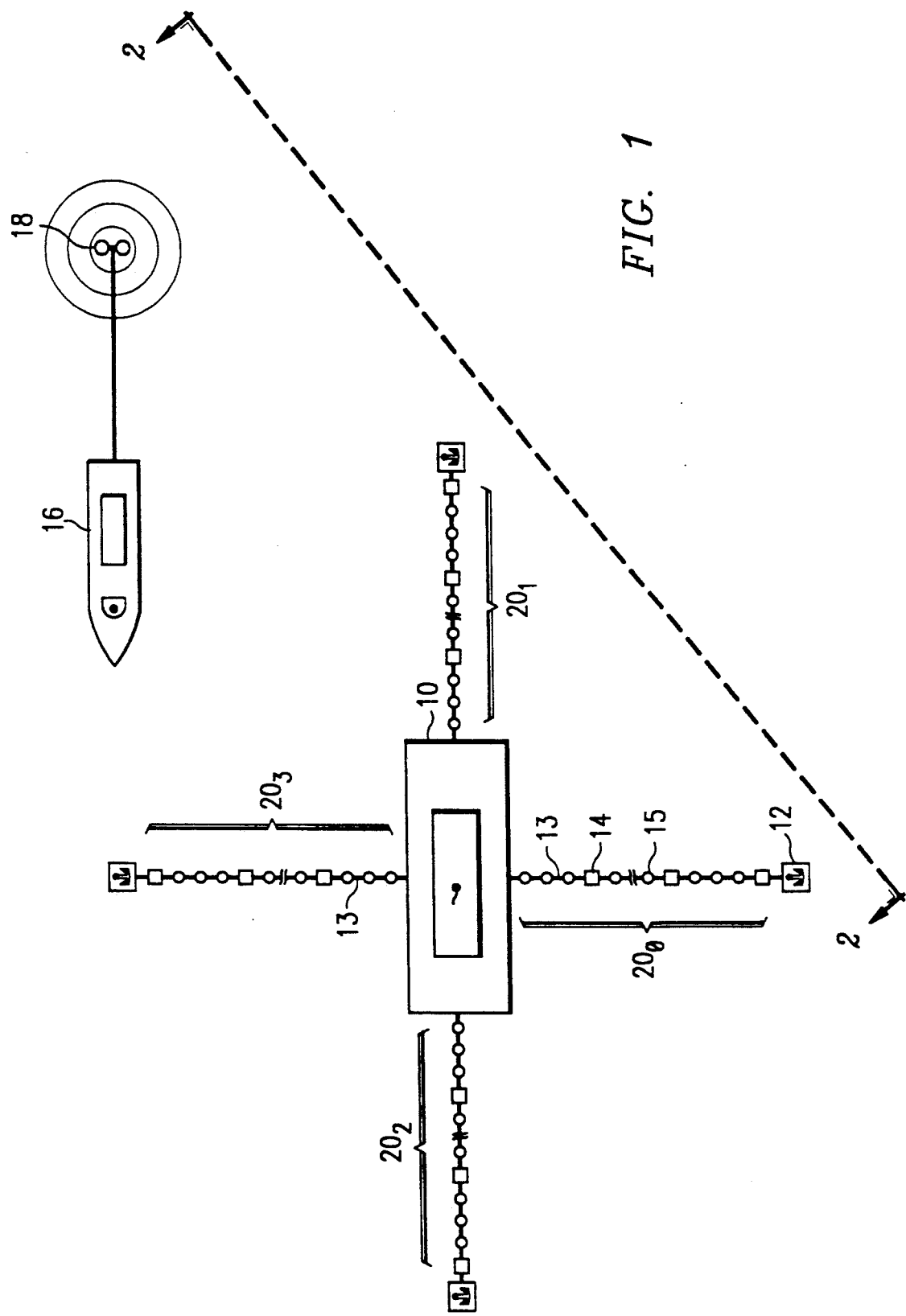
FIG. 1 is a plan view of a system for acquiring marine seismic data according to a first embodiment of the invention.

Referring now to FIG. 1, a first embodiment of a marine seismic data acquisition system according to the invention will now be described, relative to a plan view thereof. This system includes a platform 10, which may be a barge, boat, surface buoy, subsurface buoy or other such structure, which maintains a relatively fixed position either by way of anchoring or by dynamic methods (e.g., by running a motor to maintain platform 10 in substantially the same position). In the preferred embodiment of the invention, platform 10 is a barge which is anchored in the manner to be described hereinbelow. It should be noted that platform 10 may be totally floating, or may be partially or totally submerged, consistent with the type of recording or transmitting equipment thereon; for example, platform 10, if submerged, may include a transmitting antenna protruding above the surface of the water. During the survey, a conventional seismic source 18 for generating seismic energy in the form of acoustic waves is towed by, or otherwise deployed to travel with, vessel 16 in the vicinity of platform 10. Many conventional types of sources are suitable for use as source 18 according to this embodiment of the invention. It is contemplated that multiple vessels 16, each with a source 18, may also be provided for improved data acquisition efficiency.

Extending from the sides of platform 10 are receiver arrays 20. In this embodiment of the invention, four such arrays $20_0$ through $20_3$ are deployed from the sides of platform 10; it is of course contemplated that more or fewer arrays 20 may be so deployed, with the expected number of arrays 20 being on the order of two to six. Each array 20 includes cable 13 which is connected to platform 10 on one end and to an anchor 12 on the opposing end, and which has seismic receivers 15, such as groups of conventional hydrophones mounted along the length of cable 13 in the conventional manner. In the alternative to the use of anchor 12, it should be noted that cable 13 itself may be of sufficient mass and density that its terminal end (and, possibly, some of its length) will lay directly upon seafloor SF. It is contemplated that each array 20 may include from eight to thirty or more groups of hydrophones 15 along its length, depending of course on the depth of the water in which the survey is being done, and also on the number of receivers required in the survey design. It is contemplated that the length of each array 20 from platform 10 to anchor 12 can range from a few hundred feet to on the order of a mile, and will typically be on the order of one-half mile.

It should be noted that platform 10 need not be centrally located among the arrays 20. For example, each of arrays 20 may be linked, after deployment, by a bracket or other mechanical means so that platform 10 is near the center of the arrays 20 (so as to receive the electrical signals from hydrophones 15 via cables 13), but offset therefrom. Such offsetting of platform 10 may be especially desired where the survey includes firing of the source directly over the center of the group of arrays 20, as will be described hereinbelow.

As will be described in further detail hereinbelow, multiple groups of arrays 20 may be deployed in the survey. Each group of arrays 20 may have their own platform 10, or alternatively may share a platform 10 to which the receiver signals are communicated. Such a shared platform 10 would be offset from each group of arrays 20, but preferably would be symmetrically located therebetween.

Cable 13 is constructed in the conventional manner for marine seismic surveys to accomplish the mechanical and electrical mounting of hydrophones 15 therealong. An example of the construction of cable 13 is described in U.S. Pat. No. 4,958,328, incorporated herein by this reference, having the appropriate number of twisted-pair resin-insulated conductors for the number of the components mounted therealong. Mechanical protection and breaking strength is provided by a resin coating over the conductor bundle and a jacket of synthetic fiber braid. It is contemplated that other conventional types of physical construction of cable 13 may be used, depending upon the particular application of array 20 desired. Cable 13 is preferably connected to anchor 12 by way of a release mechanism, such as an acoustic release, so that array 20 can be retrieved from its anchored position separately from anchor 12. An example of a commercially available acoustic release, contemplated to be useful with arrays 20, is the model 866-A acoustic release manufactured and sold by Benthos Undersea Systems Technology.

Figure 2:
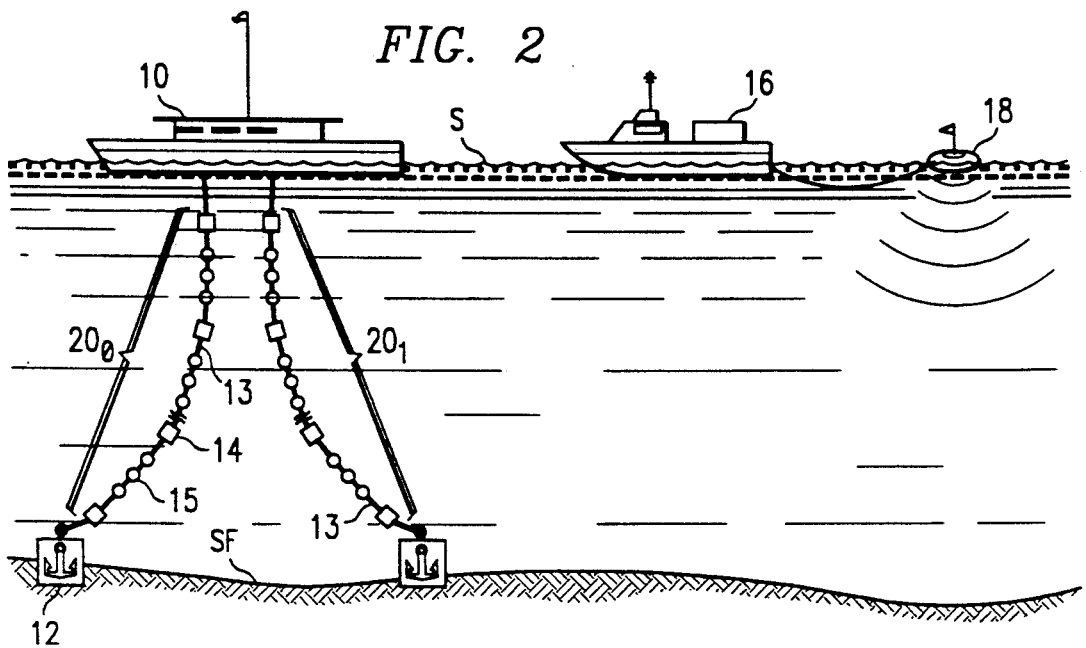
FIG. 2 is an elevation of the system of FIG. 1 as deployed in a marine environment.

Referring to FIG. 2 in conjunction with FIG. 1, the arrangement of arrays 20 relative to platform 10 will now be described. FIG. 2 illustrates that, according to this example, platform 10 floats on the surface S of the body of water. Arrays $20_0$ and $20_1$ (arrays $20_2$ and $20_3$ not visible in FIG. 2) extend from platform 10, with their anchors 12 reaching the seafloor SF. In order to maintain the desired angle of arrays 20 from the vertical, platform 10 preferably includes winches and other conventional equipment for adjustably extending the length of cable 13 between platform 10 and anchor 12, in such a manner that anchor 12 reaches seafloor SF and is maintained near the desired angle. In this example, anchors 12 not only serve to fix the position of its associated array 20 in the x-y sense to a position on seafloor SF, but also to fix the position of platform 10. It should be noted that an additional anchor may also be deployed from platform 10 to fix its position, if desired; alternative arrangements where arrays 20 do not reach seafloor SF may be used, in which case such an additional anchor will be especially useful.

Platform 10, according to this embodiment of the invention, receives electrical signals from hydrophones 15 along cable 13 for each array 20, such electrical signals corresponding to the acoustic energy detected by each hydrophone 15. As is well known in marine seismic surveying, that portion of the received acoustic energy which is of interest is that which is generated by source 18 and reflected from geological strata and interfaces below seafloor SF. Platform 10 may include the appropriate recording and storage equipment conventionally used in seismic surveys, with sufficient channels as to accommodate each of the groups of hydrophones 15, and each of the other components such as pressure transducers in arrays 20. Alternatively, platform 10 may include a transmission station which transmits the signals from hydrophones 15 to a remote storage and data processing center. For example, satellite transmission equipment may be provided on array 10, such that the recording and data processing center may be a large computer located on land.

Also connected to cable 13 in each array 20 are position transponders 14. Position transponders 14 indicate the actual position, in the x-y sense relative to the plan view of FIG. 1, to a receiving unit located on platform 10 (or elsewhere, if desired). A preferred conventional transponder suitable for use as position transponders 14 in the system of FIG. 1 is the NAVTECH Model 2410 Acoustic Transponder manufactured and sold by Navigation Technology. Other examples of position transponders are described in U.S. Pat. No. 4,635,236 and U.S. Pat. No. 4,555,779. These transponders are generally activated by a master transponder using conventional acoustic and electrical techniques in a manner to allow the calculation of the unique position of each with respect to the known position of the master transponder.

While not shown in FIGS. 1 and 2, each array 20 may additionally include one or more pressure transducers for detecting the water pressure and generating an electrical signal responsive thereto. The detected water pressure is, of course, indicative of the depth of the pressure transducer, and thus also of hydrophones 15 adjacent thereto in its array 20. Such pressure transducers, if used, may communicate its electrical signals along cable 13 to platform 10, in a separate channel from, or in multiplexed fashion with, the electrical signals from hydrophones 15.

Position transponders 14, and such pressure transducers as desired, allow the position of each array 20 in the system of FIGS. 1 and 2 to be accurately determined.

As such, while it is preferred that the arrays 20 extend in substantially straight radial directions from the center of platform 10, as is shown in FIG. 1, deviation of the actual position of each array 20 from the ideal is acceptable and can be accounted for in data processing, using the actual position of hydrophones 15 as communicated by position transponders 14.

Many alternative deployments of arrays 20 from platform 10 are also contemplated by the present invention. For example, as noted hereinabove, the terminal end of each array 20 may or may not be on seafloor SF, particularly where the water is quite deep, but instead may be suspended from platform 10 above seafloor SF, with its approximate position maintained by static (e.g., a weight) or dynamic positioning devices. The actual position of each array 20 can be monitored by way of position transponders 14 and pressure transducers, so that maintenance of the array position need not be exact at all times. In addition, it should be noted that the angle at which each array 20 is deployed may be within a wide range, from relatively horizontal in shallow water to substantially vertical in deeper water; the angle may also be selected according to the type of survey desired.

Further in the alternative, arrays 20 may be deployed so as to lay on the seafloor SF, in the same manner as fixed-bottom receivers known in the art, but arranged as described hereinabove to extend from a central location and to be in communication with platform 10. Such fixed-bottom deployment allows the use of geophones rather than hydrophones as receivers 15, including hydrophones and geophones which are capable of detecting both pressure and shear (horizontal and vertical) waves.

Figure 3:
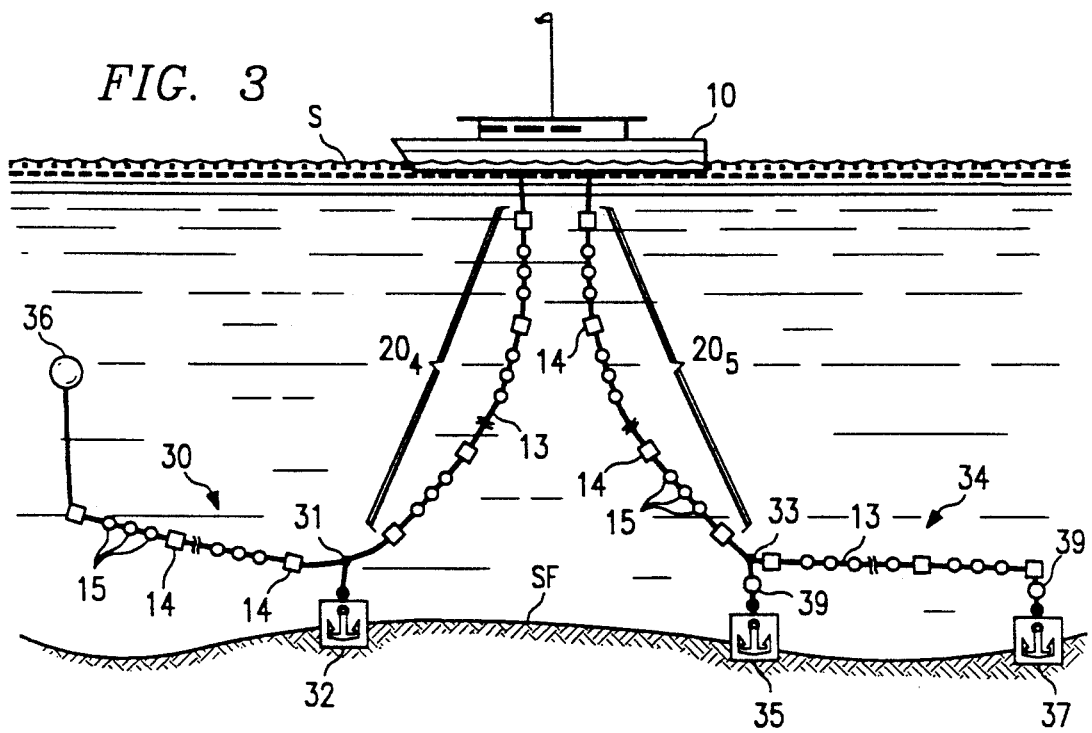
FIG. 3 is an elevation of a second embodiment of a system for acquiring marine seismic data according to the invention.

The hydrophone arrays may also include extended portions therefrom. Two examples of such extensions are illustrated in FIG. 3, and will now be described. Array $20_4$ extends from platform 10 toward anchor 32 in similar manner as described hereinabove relative to FIGS. 1 and 2. Extending from anchor 32 is another array 30, joined therewith at a junction 31. An acoustic release may be provided between junction 31 and anchor 32, to allow for retrieval of arrays 20 and 30 while leaving anchor 32 behind, similarly as described hereinabove. Array 30 is similarly constructed as arrays 20, with hydrophones 15, position transponders 14 and pressure transducers (if desired) mounted therealong in the same manner. At the distal end of array 30 from junction 31 is flotation device 36, for maintaining array 30 at an angle above seafloor SF. Electrical signals from hydrophones 15 in array 30 are communicated along cable 13 of array $20_4$ to platform 10, in the same manner as signals from hydrophones 15 in array $20_4$.

Still referring to FIG. 3, extending from array $20_5$ is another array 34, joined to array $20_5$ at junction 33. Junction 33 is connected to anchor 35 by way of acoustic release 39, in the same manner as described hereinabove. Array 34 includes hydrophones 15, position transponders 14, and pressure transducers as described hereinabove for array 20, and is connected at its terminal end, via acoustic release 39, to anchor 37 which fixes its location relative to seafloor SF. As in the case described hereinabove relative to array 30, the electrical signals from hydrophones 15 in array 34 may be communicated to platform 10 via cable 13 of array $20_5$.

Figure 4:
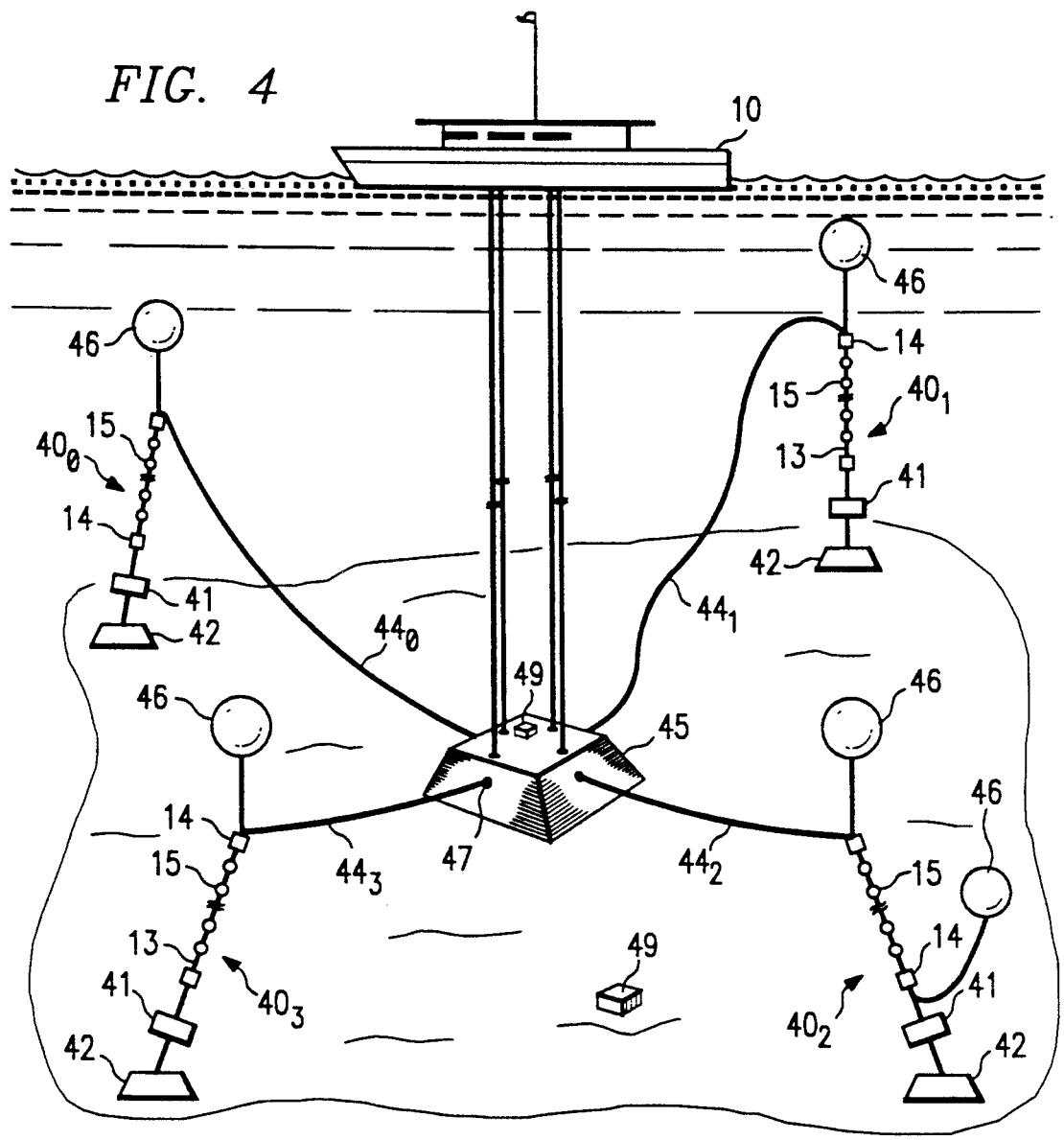
FIG. 4 is a perspective view of a third embodiment of a system for acquiring marine seismic data according to the invention.

Referring now to FIG. 4, another alternative of a system useful according to the present invention is illustrated. The system of FIG. 3 is described in more detail in copending application Ser. No. 697,637, filed contemporaneously herewith, also assigned to Atlantic Richfield Company and incorporated herein by this reference. In the system of FIG. 4, arrays 40 are constructed similarly as described hereinabove for array 20, including cable 13 to which hydrophones 15, depth transducers, and also preferably position transponders 14, are mounted along its length. In each array 40, cable 13 is coupled via release 41 to disposable anchor 42 at one end, and to buoy 46 at its other end. As shown in FIG. 4 relative to array $40_2$, an optional secondary buoy 46' may be connected to the end of cable 13 attached to release 41. Secondary buoy 46' will rise to the water surface upon release 41 letting go of cable 13, facilitating retrieval of array $40_2$.

Each array 40 in the system of FIG. 4 also includes a tensioning cable 44 connected near buoy 46 at an end thereof. Each tensioning cable 44 passes through central anchor 45, and extends to the surface where its tension and length is controlled from platform 10. Disposable anchors 42 are preferably deployed about central anchor 45 in a symmetrical fashion, for ease of seismic survey design as will be noted hereinbelow. In this embodiment of the invention, tensioning cables 44 pass into the top of central anchor 45 and out the side thereof nearest the associated array 40. The surface vessel or platform will have conventional winches and pulleys for winding or releasing tensioning cables 44.

Anchors 42 define the position of one end of each of arrays 40. The position of the buoy end of each of arrays 40, and hence its angle relative to the vertical, is controlled by the length of its associated tensioning cable 44 in the embodiment of FIG. 4. If, for example, the length of tensioning cable 44 between central anchor 45 and array 40 is sufficiently long, buoy 46 will maintain array 40 near a vertical attitude; tensioning cable 44 will have slack between central anchor 45 and its associated array 40 in such a case. In the example of FIG. 4, array 40 is in such a vertical position, due to the slack length of tensioning cable $44_1$ between central anchor 45 and array $40_1$.

If the length of tensioning cable 44 between central anchor 45 and its associated array 40 is held quite short, however, the buoy end of the associated array 40 will be pulled toward central anchor 45, and thus toward the horizontal. The shortening of this length of the tensioning cables is accomplished by a winch or similar system in platform 10. In the example of FIG. 4, array $40_2$ is in such a lowered position, as the length of tensioning cable $44_2$ between central anchor 45 and the buoy end of array $40_2$ is relatively short.

It should be noted that each of anchors 42 may optionally include a reel and variable lead length cable between itself and its associated release 41 in its array 40. This reel would preferably be spring loaded with a relatively strong retracting force, so that as the associated tensioning cable 44 is pulled from the surface through central anchor 45, a portion of the variable lead length cable would be pulled out of the reel of anchor 42. In such an arrangement, tensioning cable 44 could not only control the angle of each array 40 from the vertical, but could also control the lateral position of hydrophones 15 in each array 40 once the angle closest to the horizontal were obtained. It should be noted that the use of positioning transponders 14 within arrays 40 would be especially useful in this alternative embodiment, as the actual position of the array 40 could be determined therefrom, without requiring precision measurement and calibration of the length of tensioning cable 44 from the surface.

It is preferred that central anchor 45 include a control clamp 47 for each tensioning cable 44. Each control clamp 47 is for clamping the position of tensioning cable 44 passing therethrough, preferably in one direction. For example, said copending application Ser. No. 697,637 describes control clamp 47 as similar to a conventional snubber, oriented to maintain tension on its associated tensioning cable 44 between central anchor 45 and its associated array 40, so that it maintains the desired position of tensioning cable 44 without requiring maintenance of the tension thereon from the surface. In addition, control clamps 47 are preferably controllable by a signal, such as an acoustic signal transmitted through the water or an electrical signal directly hardwired thereto, so that control clamps 47 can be remotely controlled to release the tensioning cable 44 passing therethrough. In addition, tensioning cable 44 may include a remotely controllable release, and possibly a buoy, to facilitate its retrieval upon completion of the survey.

It should be noted that positioning transponders 49 may be placed near the system of arrays 40, for example between anchors 42 of adjacent arrays 40, or on or within central anchor 45, in addition to or instead of positioning transponders 14 in arrays 40. Such additional transponders 49 also provide information concerning the precise position of the receiver system, by way of acoustic, laser, or other conventional positioning signal techniques.

Figure 5:
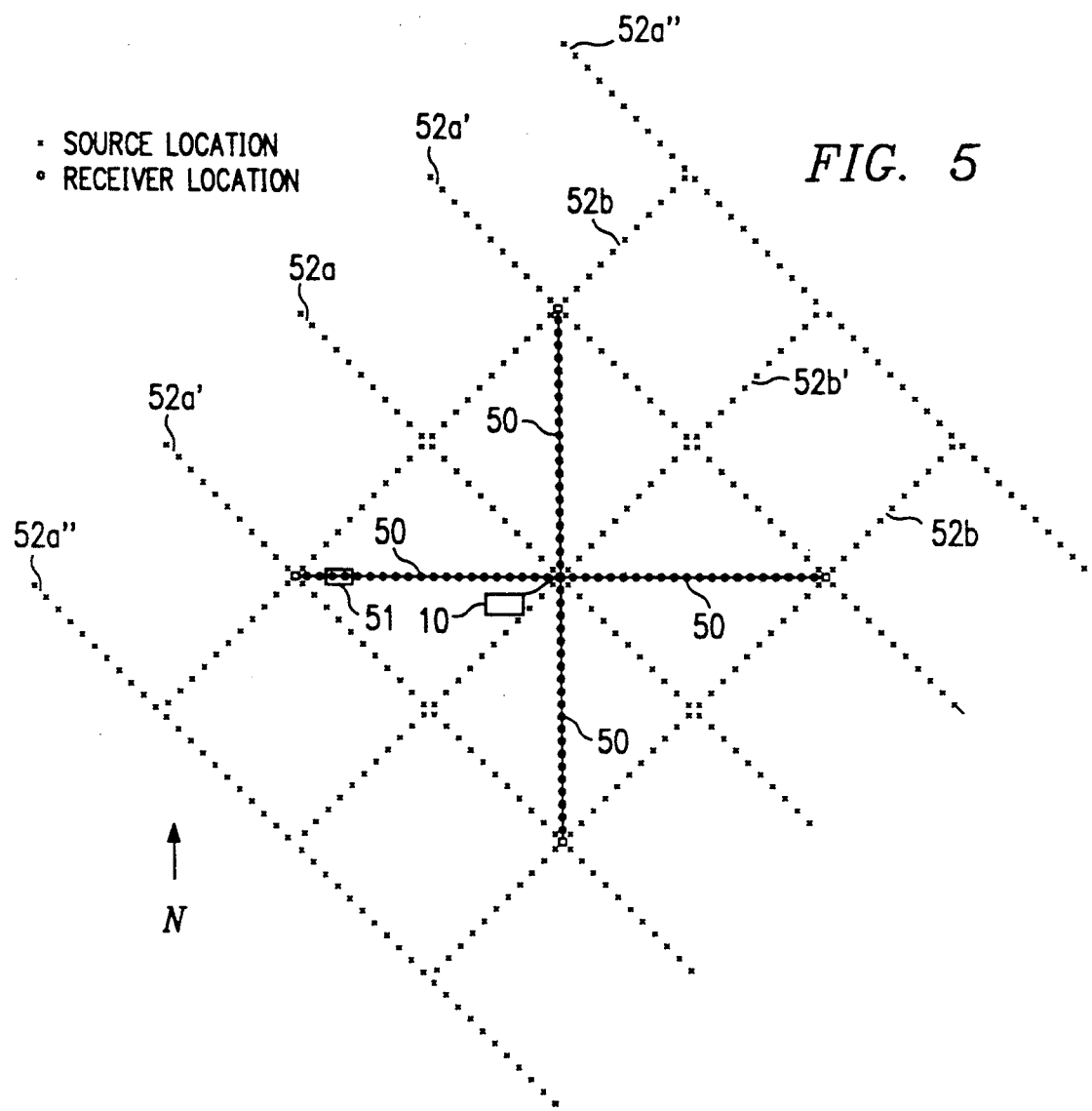
FIG. 5 is a plan view of a first example of a survey design including a single collection station.

Referring now to FIG. 5, an example of a survey design using single platform 10 and four arrays 50 extending therefrom will now be described, relative to its plan view. As will become apparent from the further description hereinbelow, the survey design of FIG. 5 is applicable to multiple platform systems as well.

In the example of FIG. 5, four arrays 50 extend from a central location; the locations of groups of hydrophones 15, in the x-y plane, are indicated by the circles in the Figure. Arrays 50 may be constructed according to any of the examples described hereinabove for arrays 20, 30, and 40, or according to alternatives or variations thereof which should now be apparent to one of ordinary skill in the art. It should be noted that arrays 50 will generally be deployed in such a manner that their distal ends will generally be nearer the seafloor SF than their proximal ends as described hereinabove; alternatively, arrays 50 may be deployed horizontally near or at seafloor SF. For ease of navigation of source vessel 16, and because of the desire to have shot locations at the center of the group of arrays 50, platform 10 is offset from the center location, but remains in communication with each of the hydrophones 15 in the arrays 50.

During the survey, source vessel 16 travels along paths 52; the crosses in paths 52 indicate locations at which seismic source energy is generated by source 18 as vessel 16 travels therealong. Alternatively, multiple vessels 16 may be traveling different paths 52 in the survey area, further improving the efficiency of the survey. Since conventional marine seismic sources may provide a shot every seven to fifteen seconds, the time required to travel the length of a path 52 can be quite short, i.e., on the order of a few minutes; depending on the survey, of course, this time may also be quite long, ranging up to on the order of several hours. In this example, the angle of each path 52 relative to each array 50 is preferably close to 45°, to optimize the fold distribution uniformly in all of the bins of the survey area of FIG. 5. It should be noted that source signals may be initiated along a single direction only, such as along paths 52a, 52a', 52a" only, with the resulting survey still having uniform fold distribution, together with good azimuthal distribution. The length and number of paths 52 can be selected according to the maximum desired source-receiver offset distance and the nominal fold of coverage desired, and the angle of each path 52 relative to each array 50 can be varied according to various other design criteria selected by the survey planners.

The survey is accomplished by the activating of the seismic source at numerous locations along the paths 52 that are desired for the particular survey. Hydrophones 15 in arrays 50 sense vibrations from sub-surface strata and interfaces therebetween, and communicate electrical signals corresponding thereto to platform 10. Platform 10 either itself stores or records the signals (for later analysis), or communicates the same to a remote data processing station. The seismic data is then analyzed in the conventional manner, including such techniques as static correction, NMO, DMO, CDP gathers, and the like, to produce output corresponding to a three-dimensional survey over the surveyed region.

Figure 6B:
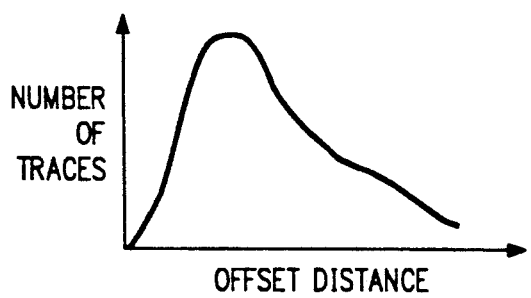
FIG. 6b is a plot of the offset distance distribution for the survey design of FIG. 5.
Figure 6A:
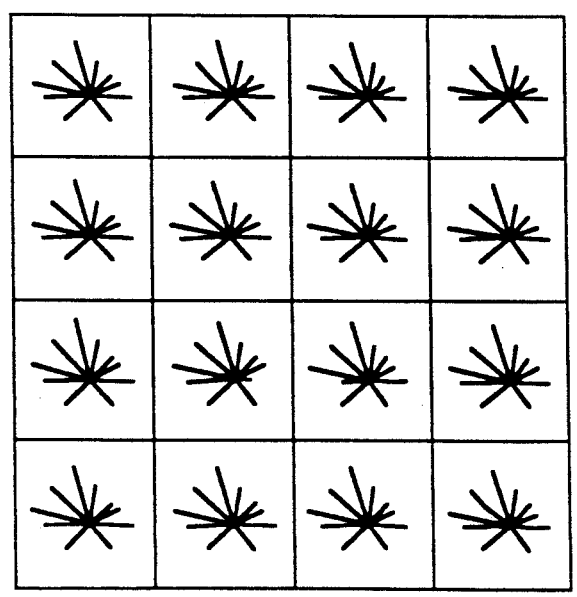
FIG. 6a is a plot illustrating the relative offset and azimuthal distribution of traces in the survey of FIG. 5, for sampled bins.

FIG. 6a illustrates the distribution of offset distances versus azimuths for a sample of sixteen bins in the survey of FIG. 5, in the case of a twelve fold survey. The sixteen bins of FIG. 6a correspond approximately to location 51 of FIG. 5, and show the results of shots fired along paths 52a and 52a" Each of the twelve points for each of the sixteen bins in FIG. 6a illustrates the source/receiver offset distance and the direction of the shot to the receiver that has a midpoint in the particular bin.

As is evident from FIG. 6a, each of the sixteen bins contains the same number of traces, namely twelve. This uniformity of fold from bin to bin is a result of the survey design according to this embodiment of the invention. As discussed in the Krey reference incorporated herein by reference, a 3-D survey of given fold allows for random noise attenuation, using conventional methods, to the same degree as a 2-D survey of from two to five times the 3-D fold. According to this embodiment of the invention, therefore, the survey of FIG. 5 provides for uniform spatial sampling, i.e., uniform fold distribution, over the bins in the survey. This uniform fold distribution is achieved by this embodiment of the invention with high efficiency, due to the minimum amount of redundant data acquired, as will now be described.

As is evident from the offset and azimuth distributions of FIG. 6a, each bin includes shots from near, medium and far offset distances, in varying azimuths, even for the relatively low nominal fold of twelve, in this example. It should also be noted that the azimuthal distribution is much more varied within each bin of FIG. 6a than in conventional 2-D or swath surveys. In addition, while the distribution of offset distance versus azimuth is somewhat uniform from bin to bin in the sample of FIG. 6a, the distribution is not identical for each bin. For example, similar "spider" plots for bins on the east side of the survey of FIG. 5 will have different offset and azimuth values from that shown in FIG. 6a for the western bins at location 51. This bin-to-bin variation of offsets and azimuths is preferred for marine 3-D surveys, as the amount of redundant data acquired in the survey is thereby reduced. According to the invention, therefore, relatively uniform spatial sampling is obtained with a reduced amount of redundant data.

Referring back to FIG. 5, the survey may be completed by a single path 52a traveled by vessel 16 and source 18, or multiple ones of paths 52a, 52a' and 52a" (e.g., paths 52a and 52a", or all paths 52a, 52a' and 52a") may be traveled to accomplish the survey. In addition to paths 52a in the first direction, one or more of paths 52b perpendicular thereto may additionally be traveled by vessel 16, with source 18 firing shots therealong. Alternatively, paths at a different angle to paths 52a, either in addition to or in substitution for perpendicular paths 52b may be used, depending upon the goals of the survey. Regardless of the angle of the path, the data will be acquired from varying azimuths and offset distances.

In the example of perpendicular paths 52b, however, since paths 52b are also at a 45° angle relative to arrays 50, the seismic data acquired, for each of the same bins, from shots along paths 52b will have distributions which are rotated 90° from that shown in FIG. 6a resulting from shots fired along paths 52a. These additional paths thus acquire data, for each bin, at the same offset distance but at a different azimuth, or alternatively at the same azimuth but at a different offset distance, relative to the data acquired for the same bins from shots fired along paths 52a. Accordingly, the data from the crossing paths 52a and 52b will be complementary rather than redundant. The fold of data will be doubled by these shots, with no shots having both the same azimuth and the same offset distance.

The number of paths 52 traveled by vessel 16 in firing shots from source 18 will depend upon the amount of data desired at the different azimuths and offset distances. For example, outer paths 52a' and inner path 52b' may be the only paths of the six which are utilized for a particular survey; alternatively, if higher fold is desired, all six paths may be traveled. Other paths than those illustrated can be utilized to acquire the desired survey data.

As is evident from FIG. 5, paths 52a and 52b pass through the center point of arrays 50. As such, some of the acquired data will have quite short source/receiver offset distances. FIG. 6b is a distribution of the offset distances for the survey of FIG. 5 (all six paths), such as for the sampled sixteen bins. As is evident in the survey, a large amount of data is acquired at short offsets, relative to the amount of data at longer offsets.

Figure 8:
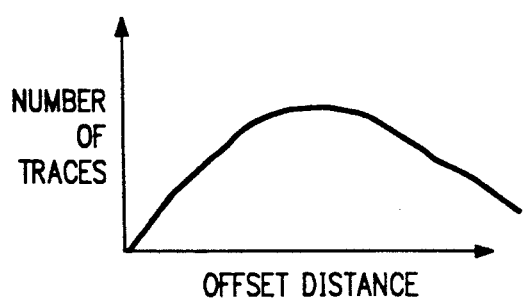
FIG. 8 is a plot of the offset distance distribution for the survey design of FIG. 7.
Figure 7:
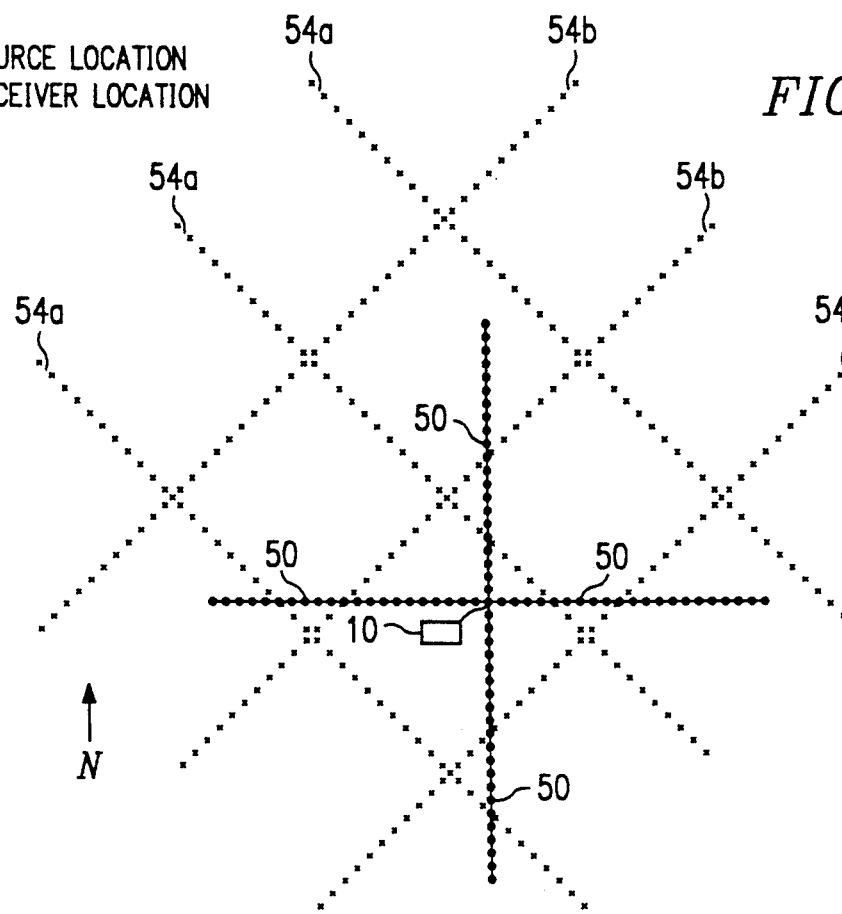
FIG. 7 is a plan view of a second example of a survey design including a single collection station.

Referring now to FIG. 7, an alternative survey is illustrated where the paths 54a and 54b do not cross the center of arrays 50. In this example, paths 54 are moved approximately one-fourth their separation in the x-direction of FIG. 7, and approximately one-half their separation in the y-direction of FIG. 7. Rudimentary analysis will show that the fold distribution will also be uniform for this survey, as in the case of the survey of FIG. 5. However, the eccentricity of paths 54 from the center of arrays 50 changes the distribution of offset distances at which data is collected, with the distribution for sampled bins in the survey of FIG. 7 illustrated in FIG. 8. As is evident from FIG. 8, the offset distribution is significantly more uniform for the survey of FIG. 7 than for that of FIG. 5 (shown in FIG. 6b), including less data at short offsets.

Numerous other modifications of the surveys of FIGS. 5 and 7 will now be apparent to those of ordinary skill in the art, depending upon the desired spatial sampling, offset distribution, maximum offset, and other survey parameters. Particularly, it should be noted that the azimuthal distribution of the data can be altered by changing the relative angles of the paths 52 to the arrays 50 of FIG. 5; for example, if the relative path-to-array angles are 90° (and 0° for crossing arrays), the locations of the midpoints will be concentrated along lines parallel to the paths. Adjustment of the path-to-array angle between these extremes will thus adjust the spatial distribution of the midpoints. In addition, while adjacent arrays 50 in FIGS. 5 and 7 are at right angles to one another, a different array-to-array angle will, for a given path direction, also change the spatial midpoint distribution.

Figure 9A:
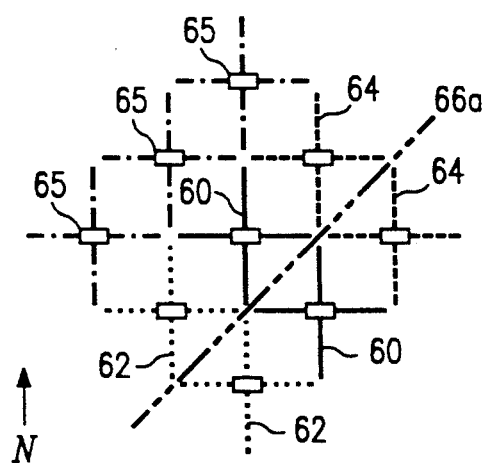
FIGS. 9a and 9b are plan views of multiple platform surveys according to an alternate embodiment of the invention.
Figure 9B:
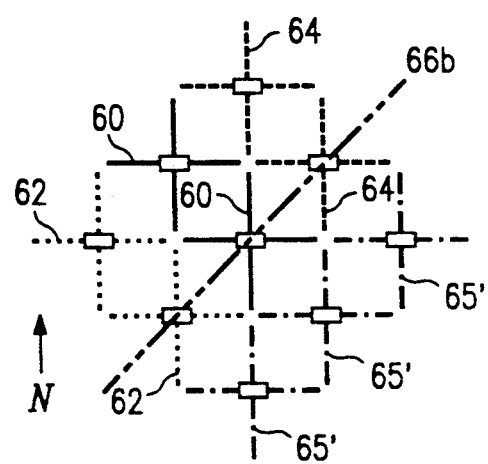

Referring now to FIGS. 9a and 9b, an example of a multiple platform survey will now be described, including a preferred example of moving the survey across the marine survey area. In this example, north is indicated for purposes of ease of reference and clarity of description. In the survey of FIG. 9a, array groups 60, 62, 64, 65 are deployed in a staggered manner, to provide high density information in the marine region of interest. Each of array groups 60, 62, 64, 65 include four arrays 50, extending at perpendicular directions from one another, with a platform 10 at or near the center as described hereinabove; the construction of array groups 60, 62, 64, 65 may be according to any of the above-described examples, or according to such variations thereof that are now apparent to those of ordinary skill in the art having reference to this description Each of array groups 60, 62, 64, 65 are deployed, in this example, so as to have their arrays end-to-end, and with adjacent array groups placed so as to be staggered, from row-to-row, by the length of a single array. In the example of FIG. 9a, array groups 65 are along the most northwesterly side of the arrangement. As shown in FIG. 9a, path 66a crosses over points near which the terminal ends of arrays in groups 60, 62 and 64 are located. Similarly as described hereinabove, since path 66a is at a 45° relative to the arrays in array groups 60, 62, 64, the survey bins will have substantially uniform fold, with a good distribution of offset distance versus azimuth in each bin. Data may be taken from all or some of array groups 60, 62, 64, 65, as desired by the survey.

Numerous variations of survey data acquisition may be used in the example of FIG. 9a. For instance, the data may be acquired in an interleaved manner, in which some of the receiver arrays are "on" (i.e., enabled to sense or transmit data) for some shots, with others of the arrays "on" for other shots. Such interleaving, or roll-up, is performed by selectively enabling certain of the array groups as the source moves along path 66a. For example, one or several shots may be fired during which array groups 60 and 62 are enabled to sense acoustic vibrations (or to transmit a signal corresponding to the sensed vibrations), and during which array groups 64 are not enabled to sense or to transmit; this is followed by one or several shots during which array groups 62 are "off" and array groups 60 and 64 are "on". This technique, as performed in conventional 2-D and 3-D surveys, is commonly referred to as a 50% roll-up. Alternatively, with two additional receiver array groups located on the northeast side of receiver array groups 64, a 100% roll-up survey may be taken, with array groups 62 and 60 on during a first segment of path 66a and with array groups 64 and the new array groups on during the next segment of path 66a (with no array groups on during both segments). Either roll-up technique can improve the efficiency of the survey where sufficient data can be sensed by each array group from half of the shots along the path.

Another alternative or option is to move certain array groups during the survey time, particularly those at larger offset distances than those of interest. As noted hereinabove, the data acquired during the example of FIG. 9a is based on the receivers in array groups 60, 62, 64. If data from array groups 65 is not desired for shots fired along path 66a, array groups 65 may be moved during this portion of the survey. FIG. 9b shows that array groups 65 have been moved during the data acquisition from path 66a to locations 65', along the most southeasterly side of region. After such movement of the arrays, data may be acquired by array groups 65' (as well as the other array groups 60, 62, 64) from shots fired along path 66b. Such movement of unused array groups during active firing periods improves the time efficiency of the survey by eliminating the dead time (during which no data can be taken) otherwise required for moving array groups from position to position.

It is contemplated that surveys may be taken where the number of array groups in the surveyed region (from northwest to southeast, in FIG. 9a) is much larger than the three shown in FIG. 9a, particularly where extremely long offset information is desired. The example of the movement of the multiple array groups shown between FIGS. 9a and 9b will particularly be applicable to such larger arrangements.

Furthermore, data may be taken along different paths through the survey region. For example, referring to FIG. 9b, a new path 66b which may be traveled by the source vessel 16 is southeast from path 66a by a distance approximately the length of an array divided by the square root of two. As such, path 66b now crosses the centers of a number of array groups. It should further be noted that while movement of array groups 65 is illustrated between FIGS. 9a and 9b, the array group positions may remain constant for a number of source vessel paths therethrough; i.e., a path 66b may also be traveled for the array group arrangement of FIG. 9a, prior to the movement of array groups 65 from the northwest to the southeast.

As suggested by FIGS. 9a and 9b, array groups 60, 62, 64, 65 may thus be "rolled" across the survey area until the survey is complete. Throughout the survey according to the present invention, seismic data of uniform fold distribution, and thus uniform spatial sampling, is acquired in a highly efficient manner. The full 3-D data so acquired enables correction of statics, attenuation of random noise, and correction for other artifacts, in a true three-dimensional sense, with no interpolation or other estimation required. In addition, the modularity of the hydrophone arrays according to the invention allows for deployment of only those receivers necessary for the receipt of the desired seismic information, and minimizes redundant data which is necessarily collected according to prior techniques. It should be noted that the acquired data will also provide excellent data for vertical seismic profiles (VSP), in a similarly efficiently collected manner.

Referring now to FIGS. 10a through 10f, examples of additional multiple-platform arrangements according to the invention will now be described in detail.

Figure 10A:
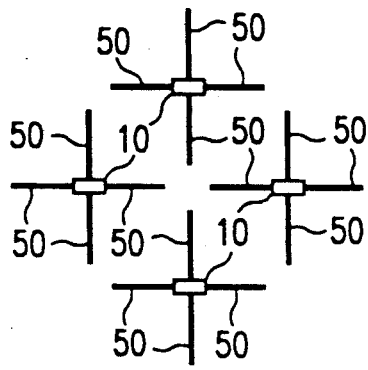
FIGS. 10a through 10f are plan views of alternative arrangements of multiple platforms in surveys according to alternate embodiments of the invention.

FIG. 10a illustrates, in plan view, a rectangular deployment of four platforms 10 and their arrays 50. Each platform 10 is arranged, relative to the others, in such a manner as to define the midpoint of a side of a rectangle. In this example, four arrays 50 extend from the four sides of each platform 10 at approximately right angles from one another. As a result, arrays 50 from adjacent platforms 10 have their terminal ends (e.g., their anchors 12, if constructed according to the embodiment of FIGS. 1 and 2 described hereinabove) near one another, defining the corners of the rectangle. An array 50 from each of the four platforms extends toward, and has its terminal end near, the center of the rectangle.

This design also will provide uniform azimuthal seismic data, with constant fold, if desired, within the volume of the survey region of FIG. 10a. In addition, as noted hereinabove, since each array 50 is separately deployed, the receivers are modularly arranged to allow for easy replacement of faulty arrays. Furthermore, the area of the survey is easily expanded by the addition of incremental platforms 10, deployed in a similar manner relative to the other platforms 10 in the system of FIG. 10a. It should be noted that the platforms 10 in the system of FIG. 10a, and any such added platforms 10, need not have all four arrays 50 deployed therefrom, particularly if deployed at the periphery of the survey area.

Figure 10B:
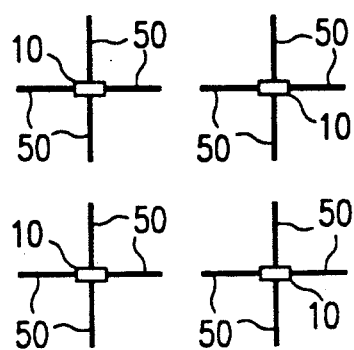

Referring to FIG. 10b, another rectangular arrangement of platforms 10 and their arrays 50 is illustrated. In the arrangement of FIG. 10b, each of the arrays 50 are deployed end-to-end with those of adjacent platforms 10, so that the distance between adjacent platforms 10 is two array lengths, rather than one as in the case of FIG. 10a. As in the prior arrangement of FIG. 10a, uniform fold data may be acquired, but the density of receivers in the arrangement 10b will be lower than that of FIG. 10a.

Figure 10C:
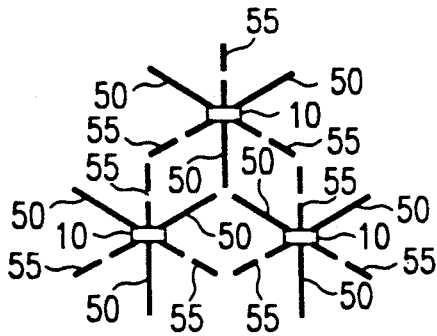

Referring now to FIG. 10c, another modular receiver system including multiple platforms 10 and arrays 50 is illustrated in plan view. In this arrangement, three platforms 10 are provided, each with three arrays 50 deployed therefrom in a symmetrical manner about each platform (i.e., at 120° angles relative to one another). The position of the platforms 10 is such that an array 50 extends from each of three adjacent platforms 10 so that the terminal end thereof (e.g., the anchor 12 if constructed as shown in FIGS. 1 and 2 hereinabove) are near one another. This arrangement of platforms 10 also provides uniform fold coverage in the region of interest as well as excellent azimuthal coverage, while maintaining the benefits of reduction in redundant trace data as noted hereinabove.

In addition, additional arrays 55 may also be deployed from each platform 10 in the arrangement of FIG. 10c. Arrays 55 are similarly deployed in symmetrical fashion relative to one another, and relative to arrays 50, such that the angle between adjacent arrays 50 and 55 is approximately 60°. The addition of arrays 55 doubles the number of hydrophones per unit volume in the region of the survey, in such a manner as to provide minimal redundancy of trace data. Also as in the case of the system of FIGS. 10a and 10b, additional incremental platforms 10 may be added to the system of FIG. 10c, increasing the size of the survey area accordingly.

Figure 10D:
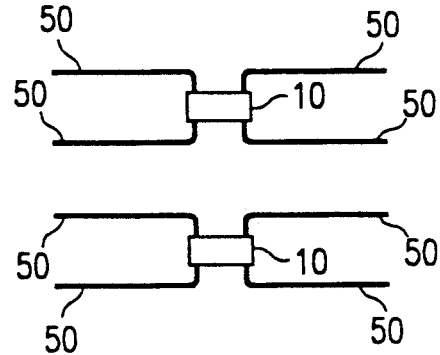

Referring to FIG. 10d, another alternative arrangement of groups of arrays 50 is illustrated. Two groups of arrays 50, each associated with a platform 10, are illustrated in FIG. 10d, it of course being understood that the survey may include multiple ones of such groups. Each of the platforms 10 in this example have four arrays 50 extending therefrom, grouped in pairs which are parallel relative to one another, with platform 10 disposed each pair. As illustrated in FIG. 10d, multiple groups of arrays may be deployed in such a manner as to provide 3-D coverage of the survey area.

As noted hereinabove, the survey technique of FIG. 5, particularly with paths which are at substantially a 45° angles to the receiver arrays 50, provides the maximum distribution of azimuthal data for each bin; variation of the angle of travel of the source vessel 16 relative to arrays 50 will narrow the azimuthal distribution of the data. The arrangement of FIG. 10d provides similar uniform azimuthal distribution for a given source path, and as such may be useful for some survey designs. It should also be noted that the angle of the arrays 50 relative to one another may be selected anywhere between the perpendicular arrangement of FIG. 5 to the dual parallel arrangement of FIG. 10d, depending upon the desired survey.

Figure 10E:
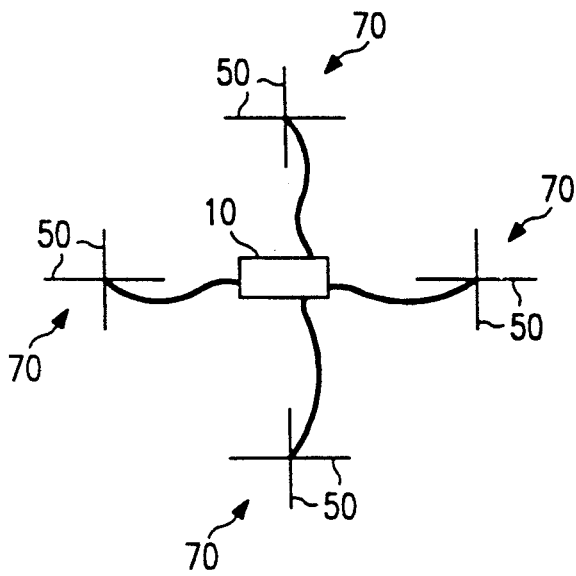

Referring now to FIG. 10e, a more sparse arrangement of array groups 70 is illustrated, including the sharing of a single platform 10 by multiple array-groups 70. In the survey of FIG. 10e, each array group 70 includes multiple arrays 50 which extend from a central location; the central location for each array group 70 preferably mechanically links the arrays 50 together thereat. In this example, the array groups 70 are deployed in a relatively sparse manner, with some separation between the terminal ends of arrays 50, for example on the order of one-fourth to one-half mile for arrays 50 which are on the order of one-half mile in length. In the example of FIG. 10e, a single platform 10 receives the signals from each of the arrays 50 in all four groups 70; preferably, such a shared platform is disposed between the multiple groups 70 in the manner shown in FIG. 10e, to minimize the length of the connecting cables therebetween. Of course, the number of arrays 50 and array groups 70 that a single platform 10 can serve depends upon the recording hardware available on platform 10. As a result, the arrangement of FIG. 10e will be equivalent, from the standpoint of data acquisition, as a similarly deployed set of array groups each having their own platform 10.

Figure 10F:
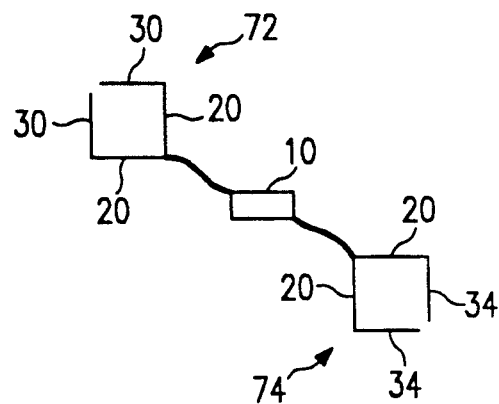

FIG. 10f is yet a further alternative deployment of multiple array groups 72 sharing a single platform 10. A first array group 72 includes two arrays 20, and two array extensions 30 extending therefrom in similar manner as described hereinabove relative to FIG. 3, only with the extensions 30 being at an angle (e.g., a right angle) to its associated array 20, such that substantially a rectangle is formed as viewed from the surface. Similarly, a second array group 74 includes two arrays 20, which are at an angle to one another (e.g., perpendicular), and two array extensions 34 such as shown in FIG. 3. Array extensions 34 are also at an angle relative to their arrays 20, for example a right angle, such that a rectangle is also formed by array group 74.

In the arrangement of FIG. 10f, the arrays 20 in each of array groups 72, 74 meet at a central location, preferably at a bracket or other mechanism which will fix their position and angle relative to one another. Platform 10, having sufficient recording equipment to handle the signals from the arrays 20 and extensions 30, 34, is deployed between array groups 72, 74 to minimize the conductor length therebetween. The arrangement of FIG. 10f, similarly as the other alternatives described hereinabove, may be repeated for multiple such groups, or used in combination with other arrangements, again depending upon the survey desired.

Additional benefits of the invention are obtained from each of the multiple platform systems of FIGS. 10a through 10f, and from modifications thereof which are now apparent to those of ordinary skill in the art having reference to this description. A primary benefit of these modular systems is their modularity, as only those platforms and arrays that are necessary for the designed survey need be deployed. In contrast, data obtained from receivers at the ends of towed streamers and arrays, at locations near the ends of the survey area, is generally discarded according to prior methods since it does not pertain to the CDPs of interest (and has less than the minimum fold required for its CDP, being at the ends of the arrays).

In addition, while providing the benefits of improved utilization of source vessels due to their stationary nature, the modular systems of FIGS. 10a through 10f allow for even further survey efficiency if multiple vessels are used.

The above system design, using a single platform 10 or multiple platforms 10, according to the various designs illustrated and described hereinabove, provides significant benefits over prior arrangements of towed or bottom-fixed marine receivers. A primary benefit of the invention is that full 3-D data is acquired in such a manner as to much reduce redundant trace collection, particularly for surveys designed as described hereinabove. In addition, the invention also provides improved seismic surveys by obtaining constant fold data, each bin containing azimuthally distributed seismic data, distributed over a range of offset distances. This uniform sampling not only gathers accurate 3-D data, but also enables attenuation of coherent noise independently of the signal or noise direction. The invention may also be used in connection with three-component vibrations (i.e., vertical, horizontal shear and vertical shear) to provide additional accuracy in the survey, by using geophones deployed on the seafloor in the manner described herein. Analysis of all three velocity components, particularly with spatially uniform sampling, can provide much improved zero offset traces for each CDP, after conventional DMO.

Efficiency improvement and cost reduction in the performing of the marine seismic survey can also be obtained through use of the invention, whether implemented as one or more platforms. Since the receiver locations are stationary during the survey, the source vessels are more efficiently utilized as they can travel directly to the next source point and immediately activate the source thereat. In contrast, prior towed receiver array 3-D surveys require waiting while the vessel turns around and re-enters the survey area for the next line. In addition, the retrievable fixed location receiver systems described hereinabove also allow for the deployment of the hydrophones beneath the stronger currents near the surface, improving the accuracy of the survey. The modular systems described herein may also be deployed near offshore drilling rigs and other cultural obstructions with no loss of data coverage, unlike towed receiver arrays which must alter their course in such regions.

In addition, the receiver systems described herein reduce the risk of loss and liability on the part of the survey operator. The retrievable hydrophone arrays described herein provide bottom fixing of their location while remaining above, or upon, the seafloor, thus limiting the risk of damage during deployment and retrieval. The arrays described herein have reduced length over conventional towed or bottom-fixed arrays, and are deployed in a more modular fashion. As such, in the event of loss of one of the arrays of the present invention, the length of cable and number of hydrophone groups that must be replaced (from spare arrays carried by the operator) is reduced compared to conventional streamer cables. Since each array is readily deployable into any position in the survey, the flexibility provided the operator in repairing or replacing the receiver arrays is also much improved.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of performing a seismic survey in a body of water, comprising:
    deploying a first plurality of receiver arrays at a fixed location, each having a plurality of receivers thereon, each of said first plurality of receiver arrays extending away from a first central location, and each of said first plurality of receiver arrays having an end fixedly located relative to said first central location so that first and second receivers disposed thereupon overlie first and second laterally-spaced positions on the seafloor;
    activating a seismic source at a plurality of locations along a path, said path being at a selected angle relative to one or more of said first plurality of receiver arrays; and
    receiving signals from said plurality of receivers corresponding to seismic energy received thereat, said received seismic energy indicative of sub-surface geology.

2. The method of claim 1, wherein said first plurality of receiver arrays extend away from first central location in a symmetrical fashion.

3. The method of claim 2, wherein said each of said first plurality of receiver arrays extend away from said first central location in a direction substantially perpendicular to that of another of said first plurality of receiver arrays adjacent thereto.

4. The method of claim 3, wherein said selected angle is substantially 45°.

5. The method of claim 4, further comprising:
    activating a seismic source at a plurality of locations along a second path, said second path at a selected angle relative to one or more of said first plurality of receiver arrays;
    and wherein said first and second paths are perpendicular to one another.

6. The method of claim 1, wherein said deploying step further comprises:
    deploying a second plurality of receiver arrays at a fixed location, each having a plurality of receivers thereon, each of said second plurality of receiver arrays extending away from a second central location, and each of said second plurality of receiver arrays having an end fixedly located relative to said second central location so that first and second receivers disposed thereupon overlie first and second laterally-spaced positions on the seafloor;
    wherein said path is also at a selected angle relative to one or more of said second plurality of receiver arrays.

7. The method of claim 6, wherein said second plurality of receiver arrays is deployed in such a manner that the terminal end of a first one of said first plurality of receiver arrays and the terminal end of a first one of said second plurality of receiver arrays are fixedly located relative to one another.

8. The method of claim 7, wherein the terminal end of each of said first plurality of receiver arrays is in contact with the seafloor.

9. The method of claim 7, wherein the terminal end of a first one of said first plurality of receiver arrays and the terminal end of a first one of said second plurality of receiver arrays are fixedly located near one another.

10. The method of claim 1, wherein said path crosses over one or more of said first plurality of receiver arrays near first central location.

11. The method of claim 1, wherein said path crosses over one or more of said first plurality of receiver arrays away from said first central location.

12. The method of claim 1, further comprising:
deploying a platform near the surface of said body of water, and near said central location;
wherein each of said first plurality of receiver arrays are connected to said platform.

13. The method of claim 12, wherein said receiving step is performed at said platform.

14. A method of acquiring seismic survey data in a marine survey area, comprising:
positioning a plurality of array groups at a fixed location in the survey area, each of said array groups comprising:
a plurality of receiver arrays, each receiver array comprising:
a cable;
a plurality of receivers mounted to said cable; and
means, attached to an end of said cable, for fixing the position of said array in such a manner that the plurality of receivers mounted to said cable overlie a plurality of laterally-spaced locations of the seafloor; and
a platform, connected to each of said receiver arrays and disposed near a central location away from which each of said receiver arrays and its plurality of receivers laterally extend;
generating seismic energy along a path in the survey area, said path at a selected angle relative to one or more of the receiver arrays of one of said array groups; and
receiving signals from said receiver arrays in said plurality of array groups corresponding to seismic energy detected thereby.

15. The method of claim 14, wherein, for each array group, said positioning step positions said receiver arrays in a symmetrical fashion about its central location.

16. The method of claim 14, wherein said generating step comprises:
traveling said path while firing a marine seismic source at selected locations therealong.

17. The method of claim 14, wherein said positioning step comprises:
positioning first and second array groups in such a manner that the terminal ends of one receiver array from each of said first and second array groups are at fixed locations relative to one another.

18. The method of claim 17, wherein said positioning step comprises:
positioning first and second array groups in such a manner that the terminal ends of one receiver array from each of said first and second array groups are near one another.

19. The method of claim 18, wherein said positioning step comprises:
positioning first and second array groups in such a manner that the terminal ends of a plurality of receiver arrays from each of said first and second array groups are near one another.

20. The method of claim 18, wherein said receiving step comprises:
enabling receivers in said first array group and disabling receivers in said second array group during such time as seismic energy is generated at a first plurality of locations along said path; and
enabling receivers in said second array group and disabling receivers in said first array group during such time as seismic energy is generated at a second plurality of locations along said path.

21. The method of claim 18, further comprising:
after said generating and receiving steps, moving said first array group to another position in the survey area.

22. The method of claim 14, wherein said generating step comprises:
generating seismic energy along a plurality of paths in the survey area, each of said paths crossing over receiver arrays of one of said array groups at a selected angle thereto.

23. The method of claim 22, wherein first and second paths in said plurality of paths are substantially parallel to one another.

24. The method of claim 22, wherein first and second paths in said plurality of paths cross one another.

25. The method of claim 14, wherein said positioning step positions said receiver arrays in each array group in such a manner that each receiver array extends from said central location in a direction substantially perpendicular to that of an adjacent receiver array in said group;
and wherein said selected angle is substantially 45°.

26. The method of claim 25, wherein said generating step comprises:
generating seismic energy along a plurality of paths in the survey area, each of said paths at said selected angle.

27. The method of claim 26, wherein first and second paths in said plurality of paths are substantially parallel to one another.

28. The method of claim 26, wherein first and second paths in said plurality of paths cross one another.

29. A system for acquiring marine seismic data, comprising:
a plurality of receiver arrays, each receiver array comprising:
a cable;
a plurality of receivers mounted to said cable; and
means, attached to an end of said cable, for fixing the position of said array in such a manner that the plurality of receivers mounted to said cable overlie a plurality of laterally-spaced locations of the seafloor; and
a platform, connected to each of said receiver arrays and disposed near a central location away from which each of said receiver arrays and its plurality of receivers laterally extend, for receiving electrical signals from the receivers in said plurality of receiver arrays corresponding to seismic energy detected thereby.

30. The system of claim 29, wherein said platform is disposed at said central location.

31. The system of claim 29, wherein said fixing means comprises an anchor.

32. The system of claim 31, wherein one of said arrays further comprises:
a release, coupled between said anchor and said cable, for releasing said cable from said anchor.

33. The system of claim 31, wherein one of said arrays further comprises:
a extension cable extending from, and connected to, the end of said cable near said anchor;
a plurality of receivers mounted along said extension cable; and
means for fixing the position of the end of said extension cable away from said anchor.

34. The system of claim 33, wherein said means for fixing the position of the end of said extension cable away from said anchor comprises a second anchor.

35. The system of claim 33, wherein said means for fixing the position of the end of said extension cable away from said anchor comprises a floatation device.

36. The system of claim 29, further comprising:
a second plurality of receiver arrays, each receiver array comprising:
a cable;
a plurality of receivers mounted to said cable; and
means, attached to an end of said cable, for fixing the position of said array in such a manner that the plurality of receivers mounted to said cable overlie a plurality of laterally-spaced locations of the seafloor; and
a second platform, connected to each of said receiver arrays in said second plurality and disposed near a second central location away from which each of said receiver arrays in said second plurality and its plurality of receivers laterally extend, for receiving electrical signals from the receivers in said second plurality of receiver arrays corresponding to seismic energy detected thereby.

37. The system of claim 36, wherein said first and second platforms are positioned in such a manner that said that the terminal ends of one receiver array from each of said first and second pluralities of receiver arrays are fixedly located relative to one another.

38. The system of claim 37, wherein said first and second platforms are positioned in such a manner that said that the terminal ends of one receiver array from each of said first and second pluralities of receiver arrays are near one another.

39. The system of claim 38, wherein said first and second platforms are positioned in such a manner that said that the terminal ends of a plurality of receiver arrays from each of said first and second pluralities of receiver arrays are near one another.

40. The system of claim 29, further comprising a seismic source.

41. The system of claim 40, further comprising a vessel for from which said seismic source is deployed.

42. The method of claim 8, wherein said plurality of receives in said first plurality of arrays comprise both hydrophones and geophones.

43. The method of claim 14, wherein the terminal end of a first of said plurality of receiver arrays in one of said plurality of array groups is in contact with the seafloor; and wherein said plurality of receivers in said first of said plurality of arrays comprise both hydrophones and geophones.

44. The system of claim 31, wherein said plurality of receivers in said plurality of receiver arrays comprise both hydrophones and geophones.

* * * * *